US007716587B2

(12) United States Patent
Firebaugh et al.

(10) Patent No.: US 7,716,587 B2
(45) Date of Patent: *May 11, 2010

(54) SELECTION ACCELERATOR IN TOPOLOGY VIEWS

(75) Inventors: Joseph E. Firebaugh, Apex, NC (US); Robert C. Leah, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 225 days.

This patent is subject to a terminal disclaimer.

(21) Appl. No.: 12/050,471

(22) Filed: Mar. 18, 2008

(65) Prior Publication Data

US 2008/0168357 A1 Jul. 10, 2008

Related U.S. Application Data

(63) Continuation of application No. 10/739,665, filed on Dec. 18, 2003, now Pat. No. 7,392,482.

(51) Int. Cl.
*G06F 15/177* (2006.01)
*G06F 15/173* (2006.01)

(52) U.S. Cl. ............... 715/734; 715/735; 715/736; 715/737; 709/224

(58) Field of Classification Search ............ 715/734, 715/735
See application file for complete search history.

(56) References Cited

U.S. PATENT DOCUMENTS

| | | | |
|---|---|---|---|
| 5,414,809 A | 5/1995 | Hogan et al. | 395/155 |
| 5,491,690 A | 2/1996 | Alfonsi et al. | 370/404 |
| 5,600,638 A | 2/1997 | Bertin et al. | 370/351 |
| 5,754,179 A | 5/1998 | Hocker et al. | 715/835 |
| 5,910,803 A | 6/1999 | Grau et al. | 715/734 |
| 6,067,093 A | 5/2000 | Grau et al. | 345/440 |
| 6,133,914 A | 10/2000 | Rogers et al. | 345/661 |
| 6,141,680 A | 10/2000 | Cucchiara | 709/201 |
| 6,404,446 B1 | 6/2002 | Bates et al. | 345/854 |

(Continued)

FOREIGN PATENT DOCUMENTS

DE 19825747 A1 12/1999

(Continued)

OTHER PUBLICATIONS

Schmitzl, "Tree navigator—a concept for navigation in big trees," IBM Research Disclosure, Aug. 2001, p. 1384-1385.

(Continued)

*Primary Examiner*—William L Bashore
*Assistant Examiner*—Andrea N Long
(74) *Attorney, Agent, or Firm*—Van Leeuwen & Van Leeuwen (57) ABSTRACT

A selection accelerator in topology views is presented. A user uses a topology view to manage a computer network whereby the topology view includes a plurality of nodes and their relationships that correspond to computer network components. When a user selects a primary node, processing identifies related nodes, and displays a relationship identifier next the related nodes, such as a hierarchal level corresponding to the primary node. By viewing the relationship identifiers, the user is able to depress a key to select a plurality of related nodes based upon their relationships. In addition, the user is able to request an invert select which informs processing to select nodes related to the primary node which are not currently selected.

8 Claims, 6 Drawing Sheets

U.S. PATENT DOCUMENTS

| | | | |
|---|---|---|---|
| 6,462,762 B1 | 10/2002 | Ku et al. | 345/853 |
| 6,476,814 B1 | 11/2002 | Garvey | 345/440 |
| 6,532,491 B1 | 3/2003 | Lakis et al. | 709/223 |
| 6,978,271 B1 * | 12/2005 | Hoffman et al. | 707/101 |
| 2002/0083170 A1 | 6/2002 | Collazo | 709/224 |
| 2002/0091857 A1 | 7/2002 | Conrad et al. | 709/238 |
| 2002/0130766 A1 * | 9/2002 | Hulvey | 340/10.31 |
| 2002/0158897 A1 | 10/2002 | Besaw et al. | 345/734 |
| 2003/0009552 A1 | 1/2003 | Benfield et al. | 709/224 |
| 2003/0028670 A1 | 2/2003 | Lee et al. | 709/241 |
| 2003/0086425 A1 | 5/2003 | Bearden et al. | 370/392 |
| 2003/0110150 A1 | 6/2003 | O'Neil et al. | 707/1 |
| 2003/0112958 A1 | 6/2003 | Beaudoin et al. | 379/221.15 |
| 2003/0126299 A1 | 7/2003 | Shah-Heydari | 709/252 |
| 2003/0130821 A1 | 7/2003 | Anslow et al. | 702/186 |
| 2003/0228908 A1 | 12/2003 | Caiafa et al. | 463/42 |
| 2004/0150644 A1 | 8/2004 | Kincaid et al. | 345/440 |
| 2004/0215764 A1 | 10/2004 | Allen et al. | 709/224 |

OTHER PUBLICATIONS

Staddon et al., "Efficient Tracing of Failed Nodes in Sensor Networks," WSNA '02, Sep. 28, 2002, pp. 122-130.

* cited by examiner

SELECTION ACCELERATOR IN TOPOLOGY VIEWS

RELATED APPLICATIONS

This application is a continuation application of U.S. Non-Provisional patent application Ser. No. 10/739,665, entitled "System and Method for Selection Accelerator in Topology Views," filed on Dec. 18, 2003 now U.S. Pat. No. 7,392,482.

BACKGROUND OF THE INVENTION

1. Technical Field

The present invention relates in general to a system and method for selection acceleration in a topology view. More particularly, the present invention relates to a system and method for selecting nodes included in a topology view based upon their relationship to a primary node selection.

2. Description of the Related Art

A computer network can be complex, often including thousands of nodes, and requires a user, such as a system administrator, to manage the computer network. A node may be a server, a client, a printer, or other device that interfaces with components within a computer network. In order to manage the vast amount of nodes, a system administrator uses topology views to graphically view the relationships between the nodes.

Five principal topologies are used to display computer networks which are a mesh topology, a bus topology, a ring topology, a star topology, and a tree topology. A mesh topology shows devices which are connected with many redundant interconnections between network nodes. In a true mesh topology, each node has a connection to every other node in the network. A bus topology shows devices which are connected to a central cable, called a bus or backbone. Bus networks are relatively inexpensive and easy to install for small networks. For example, Ethernet systems use a bus topology. A ring topology shows devices which are connected to each other in the shape of a closed loop, such that each device is connected directly to two other devices, one on either side. Ring topologies are relatively expensive and difficult to install, but they offer high bandwidth and may span large distances.

A star topology shows devices which are connected to a central hub. Star networks are relatively easy to install and manage, but bottlenecks may occur because all data is passed through a hub. A tree topology combines characteristics of linear bus and star topologies. It consists of groups of star-configured workstations connected to a linear bus backbone cable. These topologies can also be mixed. For example, a bus-star network consists of a high-bandwidth bus, called the backbone, which connects a collection of slower-bandwidth star segments.

A computer network includes a corresponding physical topology and a logical topology. A physical topology corresponds to a physical layout of a network's devices. For example, the way in which workstations are connected to a network through the actual cables that transmit data is the physical topology (e.g. the physical structure of the network).

In contrast, a logical topology is the way in which signals act on network media, or the way in which the data passes through the network from one device to the next without regard to the physical interconnection of the devices. A network's logical topology is not necessarily the same as its physical topology. For example, twisted pair Ethernet is a logical bus topology in a physical star topology layout. In another example, a token ring network is a logical ring topology which is physically set up in a star topology. Logical topologies are bound to network protocols that direct how the data moves across a network. The Ethernet protocol, for example, is a common logical bus topology protocol.

A system administrator may wish to select a plurality of nodes in a topology that are related (i.e. connected). However, the nodes may be displayed on a topology view such that they are not all easily selected at once. A challenge found, therefore, is that it is tedious to select multiple nodes in a topological graph because many topological applications implement selection with either rubber-banding multiple resources, or by clicking each resource in succession. This process is rather difficult if a user wishes to select multiple nodes with relationship. More often than not, rubber banding an area selects extra resources that are typically not needed because a rubber band selection confines within a rectangle.

What is needed, therefore, is a system and method to select a plurality of nodes which are related in an effective manner.

SUMMARY

It has been discovered that the aforementioned challenges are resolved by displaying relationship identifiers next to related nodes and allowing a user to select a plurality of related nodes based upon the relationship of the nodes. A user selects a primary node whereby processing identifies related nodes and their relationship to the primary node, such as a hierarchal level corresponding to the primary node. By viewing the relationship identifiers, the user is able to depress a key to select a plurality of related nodes based upon their relationships.

A user uses a topology view to manage a computer network whereby the topology view includes a plurality of nodes and their relationships that correspond to computer network components. When a user wishes to select a plurality of nodes that are related, a user selects a "primary node." Processing identifies nodes related to the primary node, highlights the related nodes, and displays a relationship identifier next to the related nodes. A relationship identifier corresponds to how a node is related to the selected primary node, such as how many levels below the primary node a related node exists (i.e. a first level, a second level, etc). In an embodiment where multiple branches correspond to a primary node, processing displays relationship branch identifiers next to each branch (i.e. a first branch, a second branch, etc.).

By using the relationship identifiers as a guide, the user is able to identify how many levels of a particular hierarchal tree he wishes to select. For example, the user may wish to select related nodes that are included in the first and second levels of the primary node. In this example, the user may depress a key on his keyboard, such as "2", which informs processing to highlight related nodes included in the first and second hierarchal levels. In another example, the user may wish to select nodes that are only in the second level. In this example, the user may depress a sequence of keys, such as Alt-2, which informs processing to highlight only related nodes that are included in the second level.

In yet another example, the user may wish to only select related nodes below a particular level, such as a second hierarchal level. In this example, the user may select a primary node, depress "2" to select each related node in the first and second levels, and then request an invert select. An invert select informs processing to highlight related nodes that are not currently selected, and un-highlight nodes that are currently selected. In this example, processing would un-highlight each node in the first and second hierarchal levels, and highlight the related nodes in subsequent levels. In one embodiment, a topology view may include level selections as well as branch selections corresponding to multiple branches. In this embodiment, a user may select a particular branch, and then use relationship level identifiers to select related nodes in a hierarchal level within the branch.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
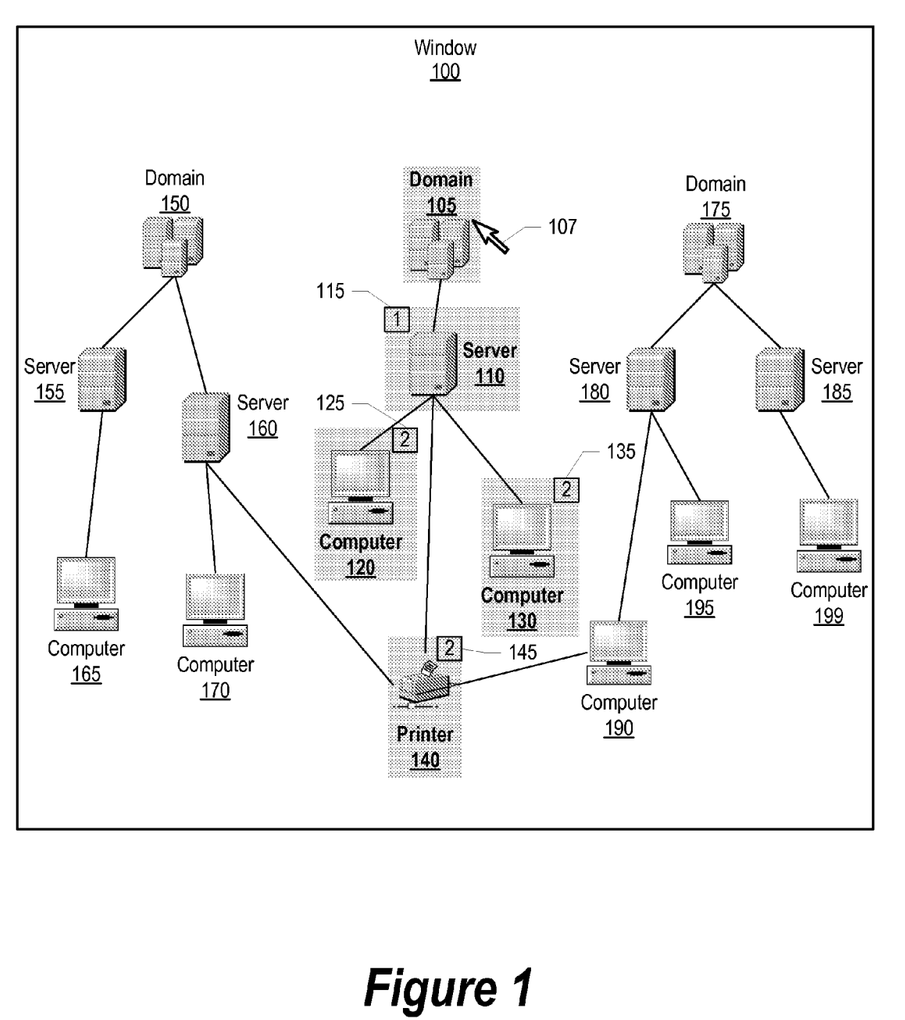
FIG. 1 is user window showing a user selecting a node level from a hierarchical tree.

FIG. 1 is user window showing a user selecting a node level from a hierarchical tree. Window 100 shows a topology view which includes a plurality of nodes. Each node corresponds to a computer system component and the topology view illustrates the relationship between each node. For example, window 100 shows three hierarchical trees in which domain 105, 150 and 175 are each a top node in the three trees.

Window 100 shows that server 110 is related to domain 105 and is one level below domain 105. In addition, window 100 shows that computer 120, computer 130, and printer 140 are related to server 110 which, in turn, computer 120, computer 150, and printer 140 are related to domain 105 and are two levels below domain 105.

Window 100 shows that server 155 and 160 are related to domain 150 and are one level below domain 150. In addition, window 100 shows that computer 165 is related to server 155 and computer 170 and printer 140 are related to server 160. Therefore, computer 165, computer 170, and printer 170 are related to domain 150 and are two levels below domain 150.

Window 100 shows that server 180 and 185 are related to domain 175 and are one level below domain 175. In addition, window 100 shows that computers 190 and 195 are related to server 180 and computer 199 is related to server 185. Therefore, computers 190, 195, and 199 are related to domain 175 and are two levels below domain 175.

When a user wishes to select a plurality of nodes related to a particular node, a user selects a "primary node", such as a top node in a hierarchal tree. Window 100 shows that a user selected domain 105 as a primary node using pointer 107. When a user selects a primary node, processing identifies nodes related to the primary node, highlights the related nodes, and displays a relationship identifier next to the related nodes. A relationship identifier corresponds to how a node is related to the selected primary node, such as how many levels below the primary node a related node exists. Relationship identifier 115 signifies that server 110 is one level below the primary node (e.g. domain 105). Relationship identifiers 125, 135, and 145 signify that computer 120, computer 130, and printer 140, respectively, are two levels below the primary node.

The user may wish to select related nodes that are included in the first and second levels of the primary node. In this situation, the user may depress a key on his keyboard, such as "2" which informs processing to highlight domain 105, server 110, computer 120, computer 130, and printer 140. The user, however, may wish to select nodes that are only in the second level. In this situation, the user may press a sequence of keys, such as Alt-2, which informs processing to highlight only related nodes that are included in the second level, such as computer 120, computer 130, and printer 140.

In yet another situation, the user may wish to select related nodes only in the first and second levels. In this situation, the user may perform an invert select. For example, the user may select domain 105 as a primary node, and then request an invert selection whereby the invert selection informs processing to highlight related nodes that are not currently selected, and un-highlight nodes that are currently selected. In this example, processing would un-highlight domain 105, and highlight server 110, computer 120, computer 130, and printer 140. In one embodiment, a topology view may include level selections as well as branch selections corresponding to multiple branches (see FIG. 2 and corresponding text for further details regarding branch selection).

Figure 2:
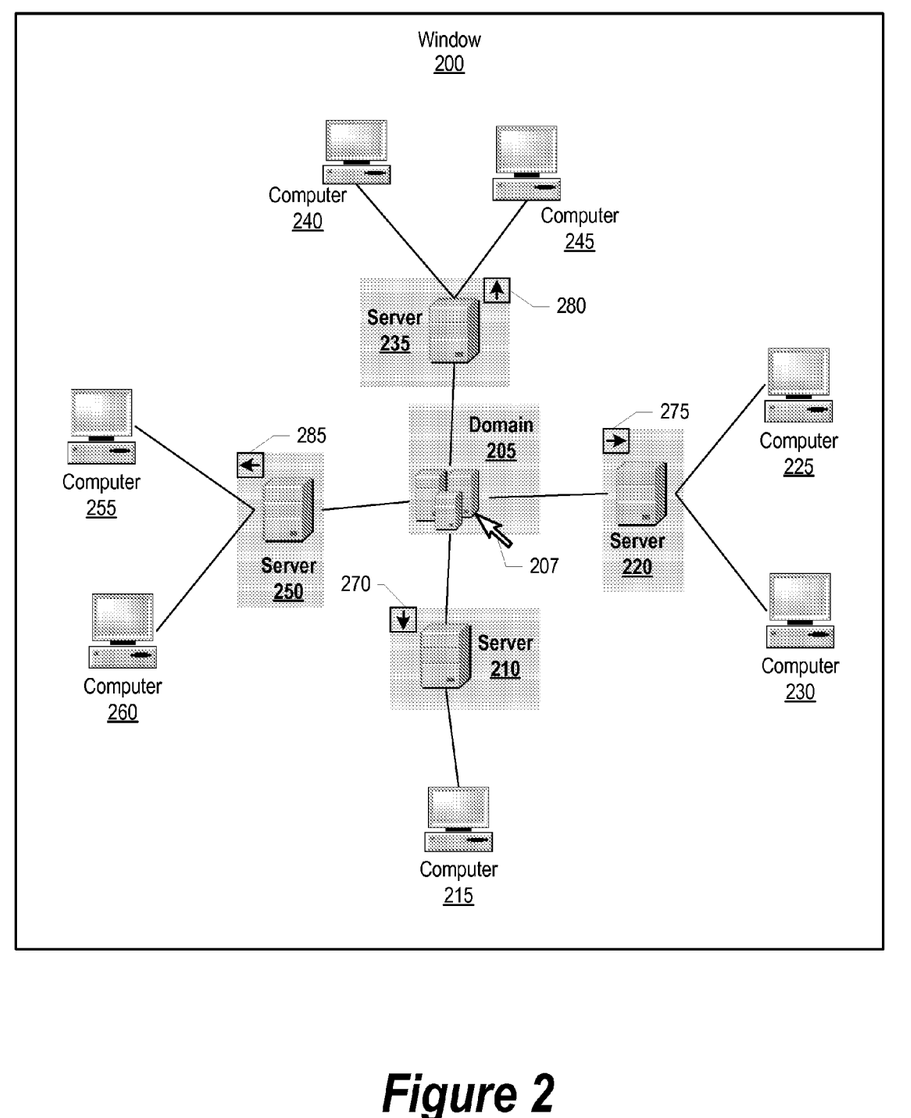
FIG. 2 is a user window showing a user selecting a branch from a topology view.

FIG. 2 is a user window showing a user selecting a branch from a topology view. FIG. 2 is similar to FIG. 1 with the exception that the topology view shown in window 200 includes multiple branches related to domain 205. Window 200 shows that a user selects domain 205 as a primary node using pointer 207. Processing identifies that domain 205 has multiple branches, and processing associates and displays a relationship branch identifier next to each related top node in each branch (see FIG. 4 and corresponding text for further details regarding branch identification).

Window 200 shows that server 210, 220, 235, and 250 are the top nodes in each branch corresponding to domain 205, and processing displays relationship branch identifiers 270, 275, 280, and 285, respectively, next to the related nodes. Window 200 shows that the relationship identifiers are arrows whereby a user may use his keyboard to select a branch by depressing a corresponding arrow. As one skilled in the art can appreciate, other relationship branch identifier schemes, such as a numerical system, may be used to distinctly identify each branch.

If the user selects a right arrow, processing displays relationship level identifiers next to server 220, computer 225, and computer 230 which correspond to the level at which each node is below the primary node (e.g. domain 205) (see FIG. 1 and corresponding text for further details regarding relationship level identifiers). If the user selects an up arrow, processing displays relationship level identifiers next to server 235, computer 240, and computer 245 which correspond to the level at which each node is below the primary node. If the user selects a left arrow, processing displays relationship level identifiers next to server 250, computer 255, and computer 260 which correspond to the level at which each node is below the primary node. And, if the user selects a down arrow, processing displays relationship level identifiers next to server 210 and computer 215 which correspond to the level at which each node is below the primary node.

Figure 3:
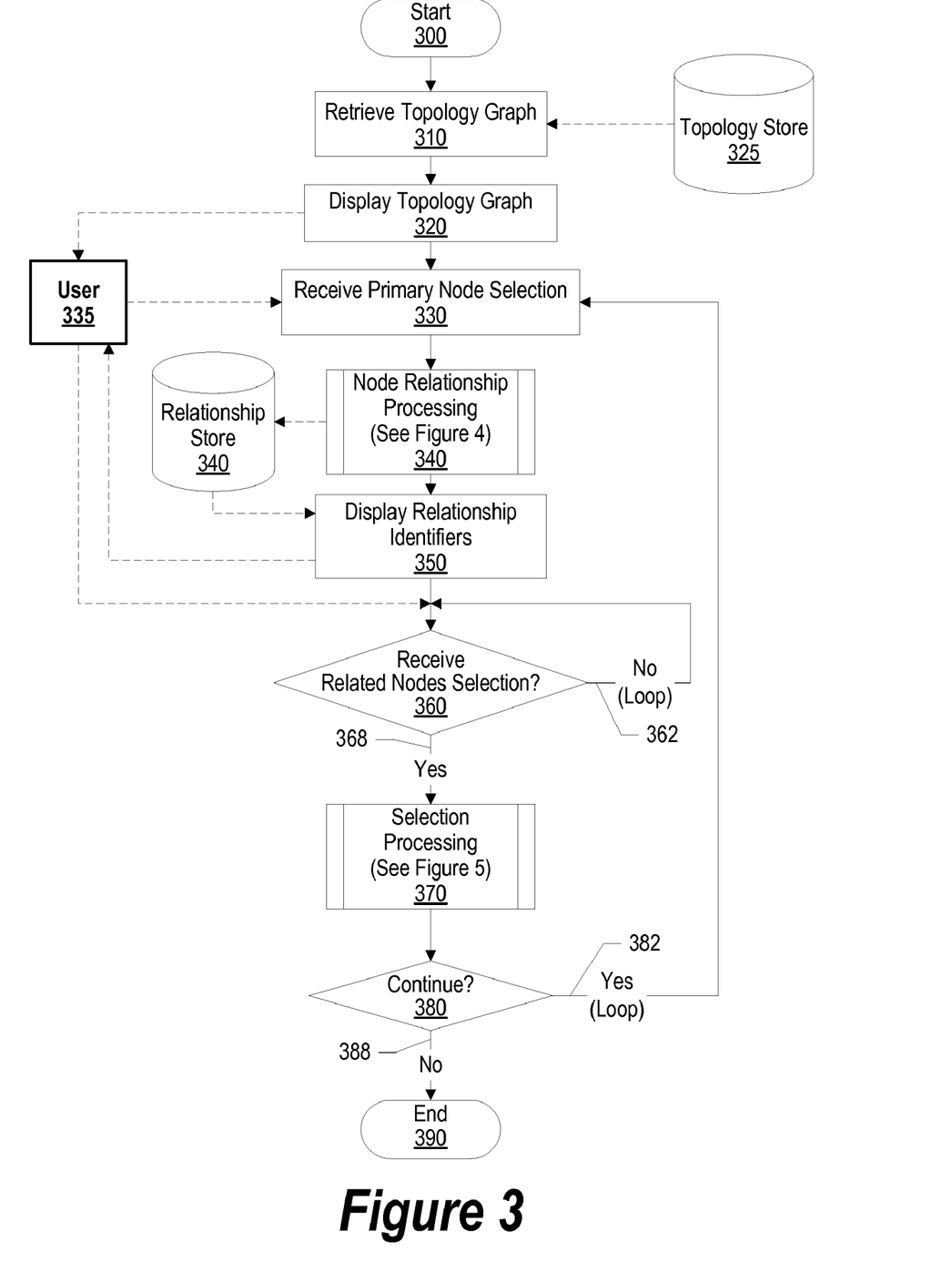
FIG. 3 is high level flowchart showing steps taken in receiving a primary node selection, receiving a related nodes selection, and highlighting related nodes based upon the selections.

FIG. 3 is high level flowchart showing steps taken in receiving a primary node selection, receiving a related nodes selection, and highlighting related nodes based upon the selections. Processing commences at 300, whereupon processing retrieves a topology view from topology store 325 at step 310. A topology view corresponds to a way in which computer system components relate to each other (see FIGS. 1, 2, and corresponding text for further details regarding component relationships). Topology store 325 may be stored on a nonvolatile storage area, such as a computer hard drive.

Processing displays the topology view on user 335's client at step 330 in order to allow user 335 to select a primary node from a plurality of nodes included in the topology view. Each node corresponds to a particular component in a user's computer system, such as a server, a printer, or an executable file.

Processing receives a primary node selection from user 335 at step 330. The primary node selection corresponds to a node that includes related nodes (i.e. hierarchical tree) that user 335 wishes to select. For example, user 335 may select a node that is at the top of a particular branch whereby user 335 wishes to select the related nodes in the entire branch. Processing identifies nodes relating to the primary node, and stores relationship identifiers corresponding to the related nodes in relationship store 340 (pre-defined process block 340, see FIG. 4 and corresponding text for further details). Using the example described above, processing may identify a node that is two levels down from the primary node, in which case processing associates a relationship level identifier of "2" to the related node, and stores it in relationship store 340. Relationship store 340 may be stored on a nonvolatile storage area, such as a computer hard drive.

Processing displays the relationship identifiers by related nodes in order for user 335 to request a related nodes selection which identifies which level and/or branch user 335 wishes to select (step 350). For example, each node that is three levels down from the primary node and is related to the primary node, processing displays a relationship level identifier of "3" by each node. A determination is made as to whether processing receives a related nodes selection from user 335 (decision 360). If processing has not received a related nodes selection, decision 360 branches to "No" branch 362 which loops back to wait for user 335's selection. This looping continues until user 335 enters a related nodes selection, at which point decision 360 branches to "Yes" branch 368.

Processing uses user 335's related nodes selection to identify and highlight particular related nodes. User 335's related nodes selection may also include an invert selection whereby processing highlights each related node that was not selected. For example, user 335 may select a primary node and related nodes down two levels. In this example, if user 335 also requests an invert selection, processing highlights nodes lower than two levels (i.e. third level, fourth level, etc.), and de-highlights the primary node and the first two levels (pre-defined process block 370, see FIG. 5 and corresponding text for further details).

A determination is made as to whether processing should continue (decision 380). If processing should continue, decision 380 branches to "Yes" branch 382 which loops back to receive and process node selections. This looping continues until processing should stop, at which point decision 380 branches to "No" branch 388 whereupon processing ends at 390.

Figure 4:
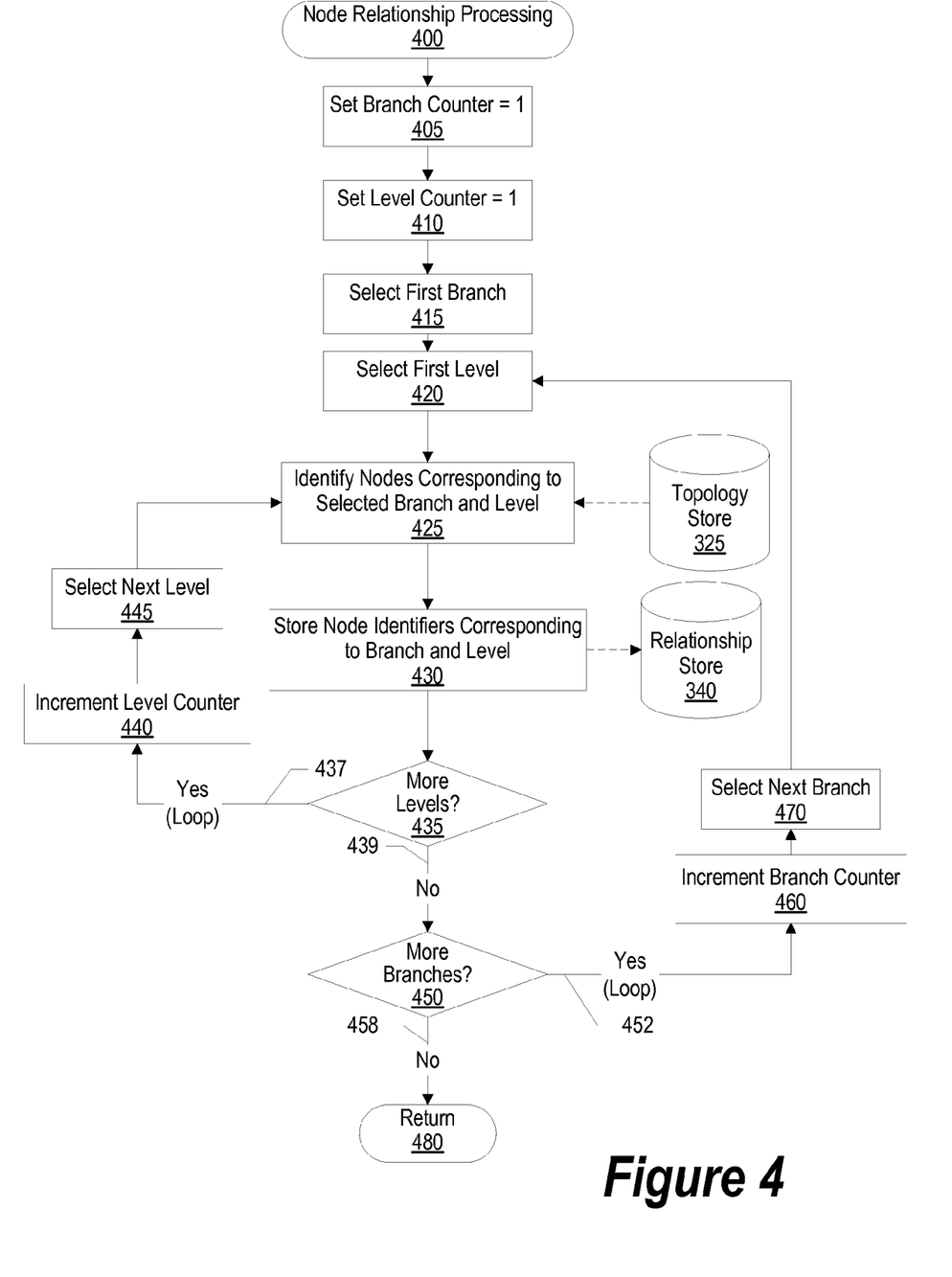
FIG. 4 is a flowchart showing steps taken in identifying related nodes that corresponding to a selected primary node.

FIG. 4 is a flowchart showing steps taken in identifying related nodes that corresponding to a selected primary node. Processing commences at 400, whereupon processing sets a branch counter to "1" (step 405). The branch counter is used to track multiple branches corresponding to a primary node. For example, a primary node may have three related nodes on separate branches whereby each node is assigned a particular branch number, such as first, second and third (see FIG. 2 and corresponding text for further details regarding primary node branches). Processing sets a level counter to "1" at step 410. The level counter is used to track multiple levels corresponding to a primary node. For example, a primary node may have related nodes in three hierarchical levels whereby each level is assigned a particular level number, such as first, second and third (see FIG. 1 and corresponding text for further details regarding primary node levels).

Processing selects the primary node's first branch at step 415, and selects the first level within the first branch at step 420. In situations where a primary node has only one branch, processing selects the branch and identifies levels within that branch. Processing identifies related nodes that correspond to the primary node's first branch and first level at step 425. Processing uses node relationship information located in topology store 325 in order to identify the related nodes. Topology store 325 is the same as that shown in FIG. 3.

Once processing identifies the related nodes, processing associates node identifiers to the related nodes and stores them in relationship store 340 (step 430). For example, a related node in the primary node's first branch and first level may correspond to a server. In this example, processing may store the server's ID, a relationship branch identifier "1", and a relationship level identifier "1" in a look-up table located in relationship store 340. Relationship store 340 is the same as that shown in FIG. 3. In one embodiment, processing may access a pre-generated look-up table that includes related node information for each node.

A determination is made as to whether there are more levels included in the first branch (decision 435). If there are more levels included in the first branch, decision 435 branches to "Yes" branch 437 which loops back to increment the level counter (step 440), select the next level (step 445), and identify related nodes in the next level. This looping continues until there are no more levels corresponding to the first level, at which point decision 435 branches to "No" branch 439.

A determination is made as to whether the primary node has more branches (decision 450). If the primary node has more branches, decision 450 branches to "Yes" branch 452 which loops back to increment the branch counter (step 460), select the next branch (step 470), and identify related nodes corresponding to the first level of the next branch. This looping continues until there are no more branches to process, at which point decision 450 branches to "No" branch 458 whereupon processing returns at 480.

Figure 5:
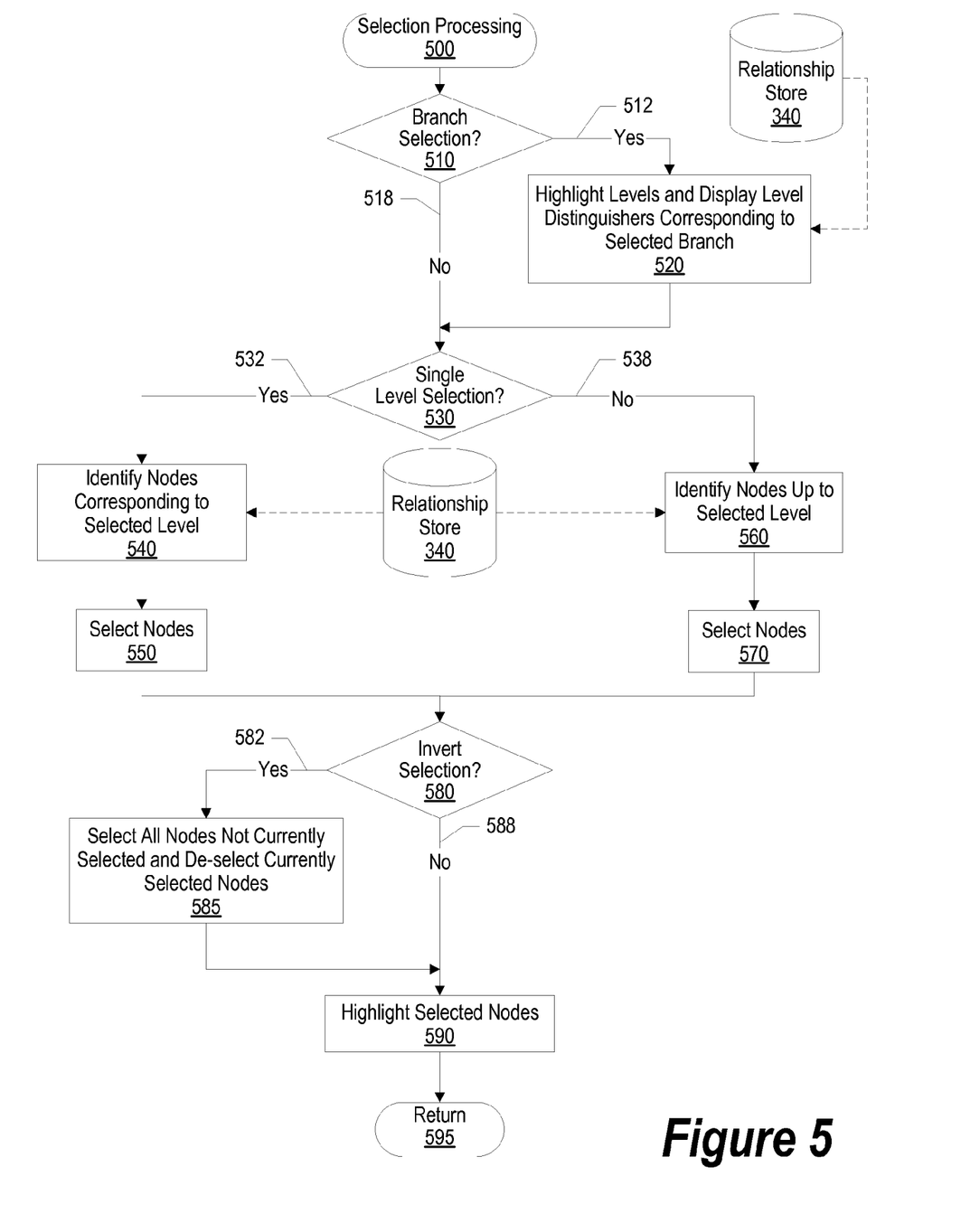
FIG. 5 is a flowchart showing steps taken in highlighting related nodes based upon user selections.

FIG. 5 is a flowchart showing steps taken in highlighting related nodes based upon user selections. Processing commences at 500, whereupon a determination is made as to whether a user has requested a related branch selection (decision 510). For example, a user may have selected a primary node with four branches whereby processing displayed four relationship branch identifiers (i.e. 1, 2, 3, 4) for the user to select. In this example, the user may have requested to select the second branch by depressing "2" on his keyboard. If the user has requested a related branch selection, decision 510 branches to "Yes" branch 512 whereupon processing identifies related nodes from relationship store 340, and highlights the related nodes corresponding to the selected branch at step 520. Relationship store 340 is the same as that shown in FIG. 3. On the other hand, if the user did not request a related branch selection, decision 510 branches to "No" branch 518 bypassing branch selection steps.

A determination is made as to whether the user has requested a single level selection (decision 530). For example, a user may be interested in highlighting nodes that are only in the third level corresponding to a primary node. In another example, a user may be interested in highlighting nodes in each level up to a third level (i.e. inclusive level selection). If the user has requested a single level selection, decision 530 branches to "Yes" branch 532 whereupon processing identifies related nodes corresponding to the selected level (step 540), and selects the nodes at step 550. Processing may choose not to highlight the selected nodes at this point in order to process a user's invert selection (see below for further details). On the other hand, if the user did not request a single level selection, decision 530 branches to "No" branch 538 whereupon processing identifies related nodes corresponding to each level up to the selected node (i.e. inclusive level selection) at step 560, and selects the nodes at step 570.

A determination is made as to whether the user has requested an invert selection (decision 580). For example, a user may select a primary node and related nodes down two levels. In this example, if the user also requests an invert selection, the user is interested in related nodes lower than the two levels (i.e. third level, fourth level, etc.). If the user requested an invert selection, decision 580 branches to "Yes" branch 582 whereupon processing selects related nodes that are not currently selected, and de-selects the related nodes that are currently selected (step 585). On the other hand, if the user did not request an invert selection, decision 580 branches to "No" branch 588 bypassing invert selection steps.

Processing highlights the selected related nodes at step 590. The related nodes may have been selected at steps 550, 570, or 585 as described above. Processing returns at 595.

Figure 6:
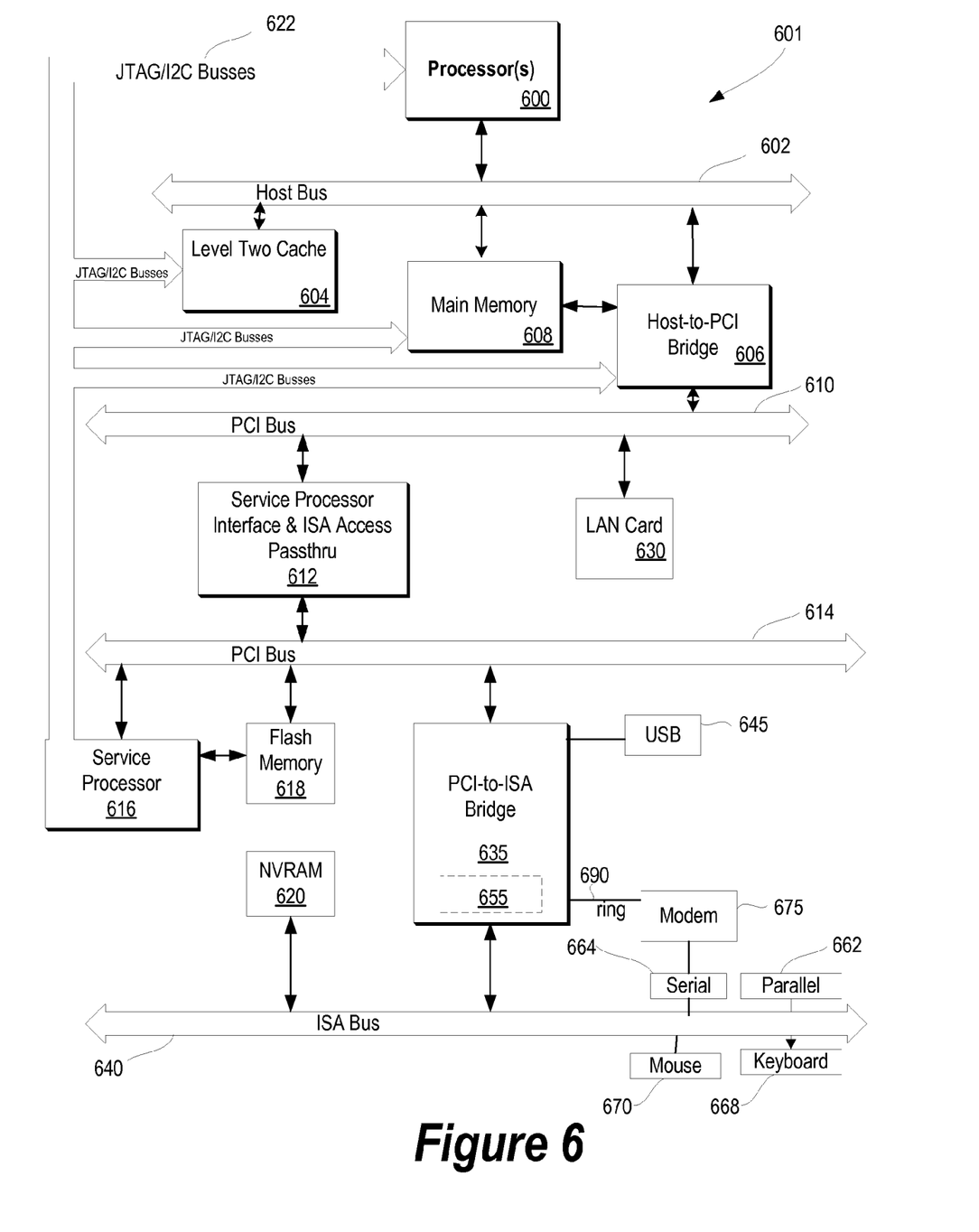
FIG. 6 is a block diagram of an information handling system capable of implementing the present invention.

FIG. 6 illustrates information handling system 601 which is a simplified example of a computer system capable of performing the computing operations described herein. Computer system 601 includes processor 600 which is coupled to host bus 602. A level two (L2) cache memory 604 is also coupled to host bus 602. Host-to-PCI bridge 606 is coupled to main memory 608, includes cache memory and main memory control functions, and provides bus control to handle transfers among PCI bus 610, processor 600, L2 cache 604, main memory 608, and host bus 602. Main memory 608 is coupled to Host-to-PCI bridge 606 as well as host bus 602. Devices used solely by host processor(s) 600, such as LAN card 630, are coupled to PCI bus 610. Service Processor Interface and ISA Access Pass-through 612 provides an interface between PCI bus 610 and PCI bus 614. In this manner, PCI bus 614 is insulated from PCI bus 610. Devices, such as flash memory 618, are coupled to PCI bus 614. In one implementation, flash memory 618 includes BIOS code that incorporates the necessary processor executable code for a variety of low-level system functions and system boot functions.

PCI bus 614 provides an interface for a variety of devices that are shared by host processor(s) 600 and Service Processor 616 including, for example, flash memory 618. PCI-to-ISA bridge 635 provides bus control to handle transfers between PCI bus 614 and ISA bus 640, universal serial bus (USB) functionality 645, power management functionality 655, and can include other functional elements not shown, such as a real-time clock (RTC), DMA control, interrupt support, and system management bus support. Nonvolatile RAM 620 is attached to ISA Bus 640. Service Processor 616 includes JTAG and I2C busses 622 for communication with processor(s) 600 during initialization steps. JTAG/I2C busses 622 are also coupled to L2 cache 604, Host-to-PCI bridge 606, and main memory 608 providing a communications path between the processor, the Service Processor, the L2 cache, the Host-to-PCI bridge, and the main memory. Service Processor 616 also has access to system power resources for powering down information handling device 601.

Peripheral devices and input/output (I/O) devices can be attached to various interfaces (e.g., parallel interface 662, serial interface 664, keyboard interface 668, and mouse interface 670 coupled to ISA bus 640. Alternatively, many I/O devices can be accommodated by a super I/O controller (not shown) attached to ISA bus 640.

In order to attach computer system 601 to another computer system to copy files over a network, LAN card 630 is coupled to PCI bus 610. Similarly, to connect computer system 601 to an ISP to connect to the Internet using a telephone line connection, modem 675 is connected to serial port 664 and PCI-to-ISA Bridge 635.

While the computer system described in FIG. 6 is capable of executing the processes described herein, this computer system is simply one example of a computer system. Those skilled in the art will appreciate that many other computer system designs are capable of performing the processes described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. An information handling system comprising:
one or more processors;
a memory accessible by the processors;
a display device;
a pointing device;
one or more nonvolatile storage devices accessible by the processors; and
a node selection tool for highlighting one or more related nodes, the node selection tool comprising software code effective to:
receive a primary node selection corresponding to a primary node;
set a branch counter to one and a level counter to one in response to receiving the primary node selection;
identify one or more related nodes corresponding to the primary node, the
identifying further comprising software code effective to:
select a first branch that corresponds to the primary node;
select a first level that corresponds to the primary node;
identify nodes that correspond to the first branch and the first level;
store one or more node identifiers that correspond to both the first branch and the first level;
in response to determining that there are additional levels, increment the level counter to a next level;
identify additional nodes that correspond to both the first branch and the next level;
store one or more relationship node identifiers that correspond to both the first branch and the next level;
in response to determining that there are additional branches, increment the branch counter to a next branch;
identify additional nodes that correspond to both the next branch and the first level;
store one or more relationship node identifiers that correspond to both the next branch and the first level;
receive a related nodes selection corresponding to one of the relationship level identifiers, wherein an intermediate node level exists between the primary node and the node selection level, the intermediate node level including a plurality of intermediate nodes; and
highlight the primary node and the related nodes that correspond to each node level up to and including the related nodes selection level, which includes each of the plurality of intermediate nodes.

2. The information handling system of claim 1 wherein the software code is further effective to:
display one or more relationship identifiers on the display device, wherein at least one of the relationship identifiers is selected from the group consisting of a relationship level identifier and a relationship branch identifier.

3. The information handling system of claim 1 wherein the highlighting is performed on the related nodes that only correspond to the related node selection level.

4. The information handling system of claim 1 wherein the software code is further effective to:
receive an invert selection request; and
perform the highlighting using each of the plurality of related nodes that do not correspond to each node level up to and including the related node selection level.

5. A computer program product stored on a computer operable media, the computer operable media containing instructions for execution by a computer, which, when executed by the computer, cause the computer to implement a method of highlighting related nodes, the method comprising:
receiving a primary node selection corresponding to a primary node;
setting a branch counter to one and a level counter to one in response to receiving the primary node selection;
identifying one or more related nodes corresponding to the primary node, the identifying further comprising:
selecting a first branch that corresponds to the primary node;
selecting a first level that corresponds to the primary node;
identifying nodes that correspond to the first branch and the first level;
storing one or more node identifiers that correspond to both the first branch and the first level;
in response to determining that there are additional levels, incrementing the level counter to a next level;
identifying additional nodes that correspond to both the first branch and the next level;
storing one or more relationship node identifiers that correspond to both the first branch and the next level;
in response to determining that there are additional branches, incrementing the branch counter to a next branch;
identifying additional nodes that correspond to both the next branch and the first level;
storing one or more relationship node identifiers that correspond to both the next branch and the first level;
receiving a related nodes selection corresponding to one of the relationship level identifiers, wherein an intermediate node level exists between the primary node and the node selection level, the intermediate node level including a plurality of intermediate nodes; and
highlighting the primary node and the related nodes that correspond to each node level up to and including the related nodes selection level, which includes each of the plurality of intermediate nodes.

6. The computer program product of claim 5 wherein the method further comprises:
displaying one or more relationship identifiers, wherein at least one of the relationship identifiers is selected from the group consisting of a relationship level identifier and a relationship branch identifier.

7. The computer program product of claim 5 wherein the highlighting is performed on the related nodes that only correspond to the related node selection level.

8. The computer program product of claim 5 wherein the method further comprises:
receiving an invert selection request; and
performing the highlighting using each of the plurality of related nodes that do not correspond to each node level up to and including the related node selection level.

* * * * *